United States Patent
Tanaka et al.

(10) Patent No.: US 8,238,629 B2
(45) Date of Patent: Aug. 7, 2012

(54) IMAGE ANALYSIS DEVICE AND IMAGE ANALYSIS METHOD

(75) Inventors: Hideki Tanaka, Tama (JP); Hirokazu Nishimura, Hachioji (JP); Kenji Nakamura, Chiba (JP); Ryoko Inoue, Hachioji (JP); Miho Sawa, Hino (JP)

(73) Assignee: Olympus Medical Systems Corp., Tokyo (JP)

( * ) Notice: Subject to any disclaimer, the term of this patent is extended or adjusted under 35 U.S.C. 154(b) by 1000 days.

(21) Appl. No.: 12/208,720

(22) Filed: Sep. 11, 2008

(65) Prior Publication Data
US 2009/0074268 A1     Mar. 19, 2009

Related U.S. Application Data

(63) Continuation of application No. PCT/JP2007/054212, filed on Mar. 5, 2007.

(30) Foreign Application Priority Data

Mar. 14, 2006   (JP) ................................. 2006-069817

(51) Int. Cl.
    *G06K 9/00*    (2006.01)
(52) U.S. Cl. ...................................................... 382/128
(58) Field of Classification Search .................. None
    See application file for complete search history.

(56) References Cited

U.S. PATENT DOCUMENTS

| | | | | |
|---|---|---|---|---|
| 6,154,560 A | * | 11/2000 | Cothren et al. | 382/128 |
| 6,947,784 B2 | * | 9/2005 | Zalis | 600/425 |
| 2002/0164060 A1 | * | 11/2002 | Paik et al. | 382/128 |
| 2004/0228529 A1 | * | 11/2004 | Jerebko et al. | 382/173 |

FOREIGN PATENT DOCUMENTS

| | | |
|---|---|---|
| JP | 04-193254 | 7/1992 |
| JP | 2005-157902 | 6/2005 |
| JP | 2005-192880 A | 7/2005 |

OTHER PUBLICATIONS

Yamaguchi, Y, et al., "Usability of Magnifying Endoscope in Gastric Cancer Diagnosis", Digestive Endoscopy vol. 13, No. 3, 2001, pp. 349-354.

Hisayama, K. et al., "Automated Detection for Colonic Polyps Based on Recognition of Shape by Using Complex Partial Correlation Coefficient", Japan Society of Computer Aided Surgery, Computer Aided Diagnosis of Medical Images Godo Ronbunshu, Dec. 10, 2004, pp. 291-292.

* cited by examiner

*Primary Examiner* — Stephen R Koziol
*Assistant Examiner* — Nirav G Patel
(74) *Attorney, Agent, or Firm* — Scully, Scott, Murphy & Presser, P.C.

(57) ABSTRACT

A CPU implements a possible polyp detection process of step S4 to execute processing for each label value of a thinned image and superimpose a processing result on a possible polyp image, thereby generating a possible polyp labeling image in which a possible polyp edge is labeled. The possible polyp labeling image, in which the possible polyp image is superimposed on an original image, is displayed on a display device so that a possible polyp location on the image can be easily checked, thereby improving the detection accuracy of an intraluminal abnormal tissue.

6 Claims, 15 Drawing Sheets

IMAGE ANALYSIS DEVICE AND IMAGE ANALYSIS METHOD

CROSS REFERENCE TO RELATED APPLICATION

This application is a continuation application of PCT/JP2007/054212 filed on Mar. 5, 2007 and claims benefit of Japanese Application No. 2006-069817 filed in Japan on Mar. 14, 2006, the contents of which are incorporated herein by this reference.

BACKGROUND OF INVENTION

1. Field of the Invention

The present invention relates to an image analysis device and an image analysis method that detect a polyp from a medical image.

2. Description of the Related Art

In the medical field, a diagnosis has been widely performed using an image pickup instrument such as X-ray, CT, MRI, ultrasound observation device, and endoscopic device.

For example, in an endoscopic device, the diagnosis can be performed by inserting an elongated insertion section in a body cavity and using image pickup section such as a solid-state image pickup device to thereby observe intracavital organs on a monitor screen. An ultrasound endoscopic device is also widely used that is capable of detecting or diagnosing by irradiating ultrasound to the intracavital organs and observing the conditions of the intracavital organs on a monitor screen based on the reflection or the transmittance of the ultrasound.

The conclusive diagnosis using images picked up by these devices is largely dependent on the subjectivity of the doctor. Thus, there is a diagnosis supporting device that supports the doctor's diagnosis by calculating a feature value related to an image to be picked up using an image analysis method and presenting objective and numerical diagnosis supporting information to the doctor.

The feature value herein denotes a numerical value that reflects various findings on the image and can be obtained by applying the image analysis method.

For example, in an endoscopic image, a finding related to the color tone such as redness of mucous surface, a finding related to the shape of blood vessels such as bending and meandering of blood vessels observed in a transparent blood vessel image, and a finding related to the mucous pattern in the gastric area are important factors in malignancy diagnosis of lesion. Non-Patent Document 1 ("Digestive Endoscopy", 2001 Vol. 13 No. 3 vol. 13, Tokyo Igakusha P349-354) is an example of discrimination of lesion malignancy based on a mucous finding and a finding related to the shape of blood vessels.

For example, in Japanese Patent Application Laid-Open Publication No. 2005-157902 and other documents, an image analysis method is disclosed that is capable of improving the lesion determination accuracy based on an objectified result of the findings using the feature value. In Japanese Patent Application Laid-Open Publication No. 2005-157902, blood vessels in the digestive tract image are extracted as a linear pattern for use in the lesion determination in the image analysis method.

SUMMARY OF THE INVENTION

One aspect of an image analysis device of the present invention comprises: edge extraction processing section for executing an edge extraction process that extracts an edge of an intraluminal image; and possible intraluminal abnormal tissue detection processing section for determining whether the edge is an edge of an intraluminal abnormal tissue based on edge line data and/or edge periphery pixel data of each edge extracted by the edge extraction section.

One aspect of an image analysis method of the present invention comprises: an edge extraction processing step of executing an edge extraction process to an intraluminal image; and a possible intraluminal abnormal tissue detection processing step of determining whether the edge is an edge of an intraluminal abnormal tissue based on edge line data and/or edge periphery pixel data of each extracted edge.

DETAILED DESCRIPTION OF THE PREFERRED EMBODIMENT(S)

The embodiments of the present invention will now be described with reference to the drawings.

(First Embodiment)

Figure 1:
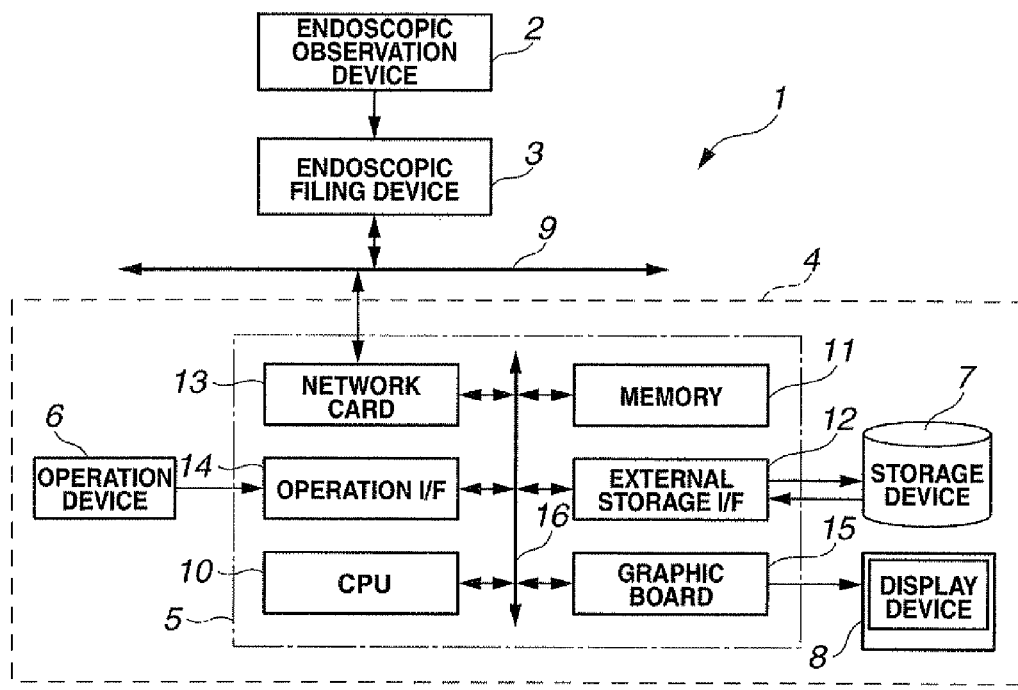
FIG. 1 is a configuration diagram showing a configuration of an endoscopic image analysis device according to a first embodiment of the present invention.
Figure 2:
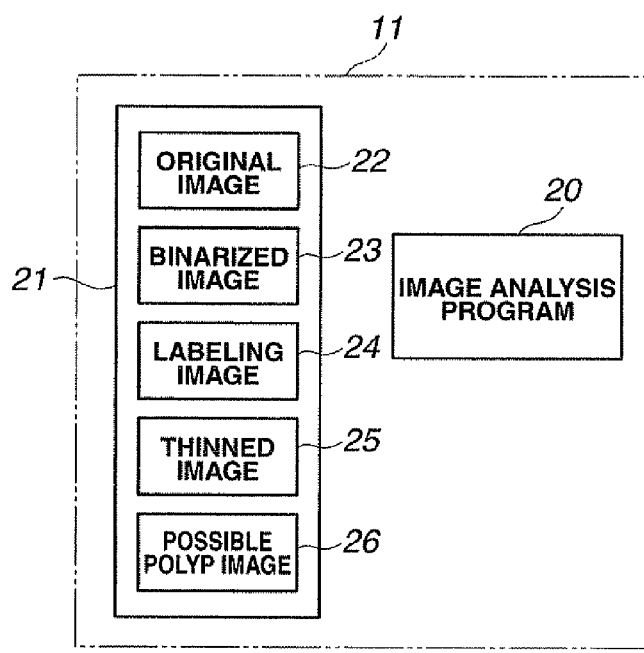
FIG. 2 is a diagram showing information stored in a memory of FIG. 1.
Figure 3:
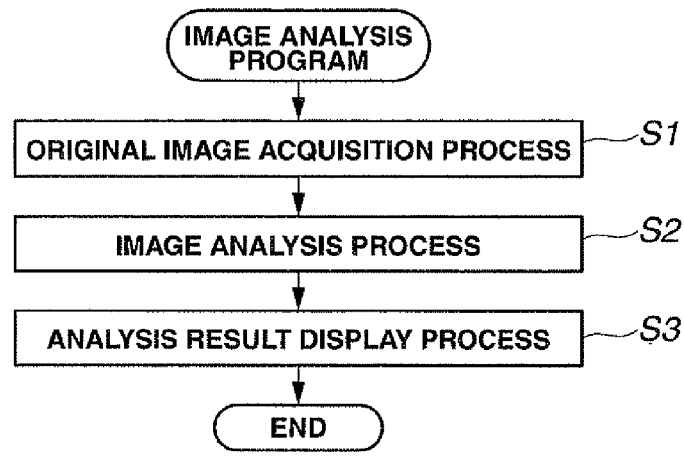
FIG. 3 is a flow chart showing a flow of a process of an image analysis program executed by a CPU of FIG. 1.
Figure 4:
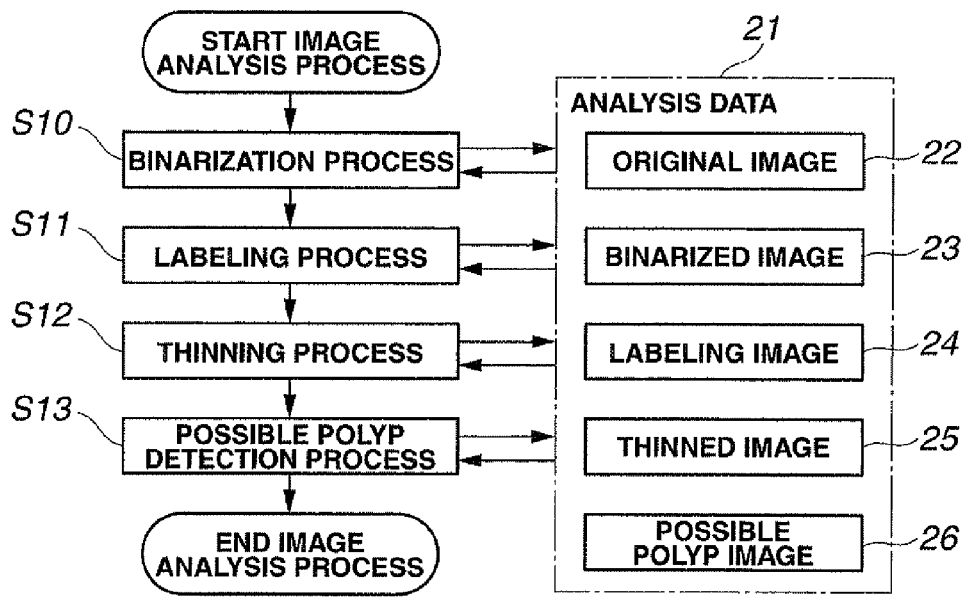
FIG. 4 is a flow chart showing a flow of the image analysis process of FIG. 3.
Figure 5:
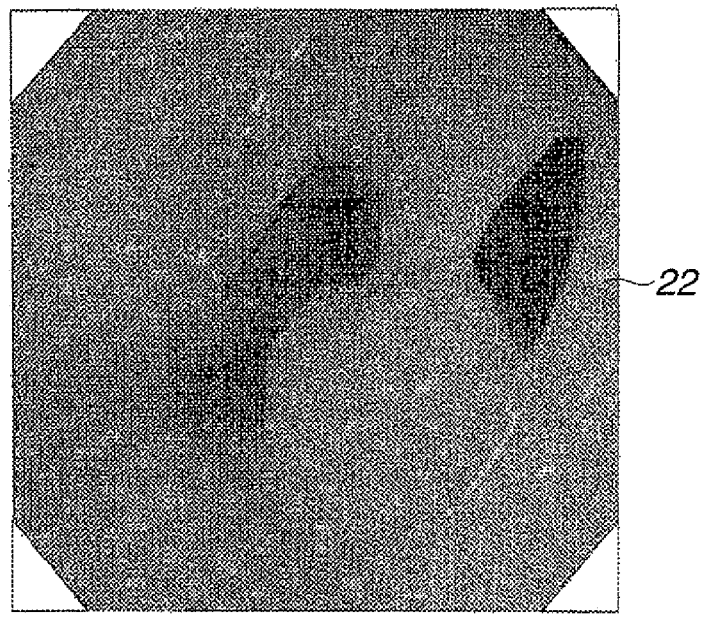
FIG. 5 is a diagram showing an original image stored in the memory of FIG. 1.
Figure 6:
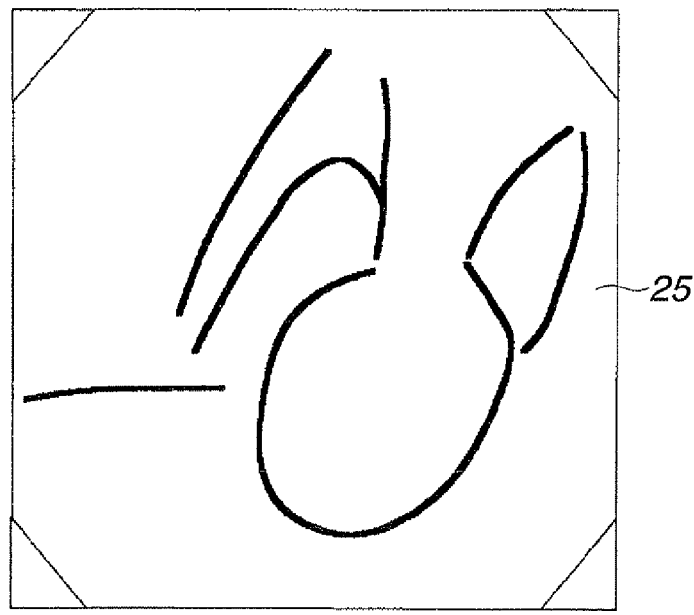
FIG. 6 is a diagram showing a thinned image stored in the memory of FIG. 1.
Figure 7:
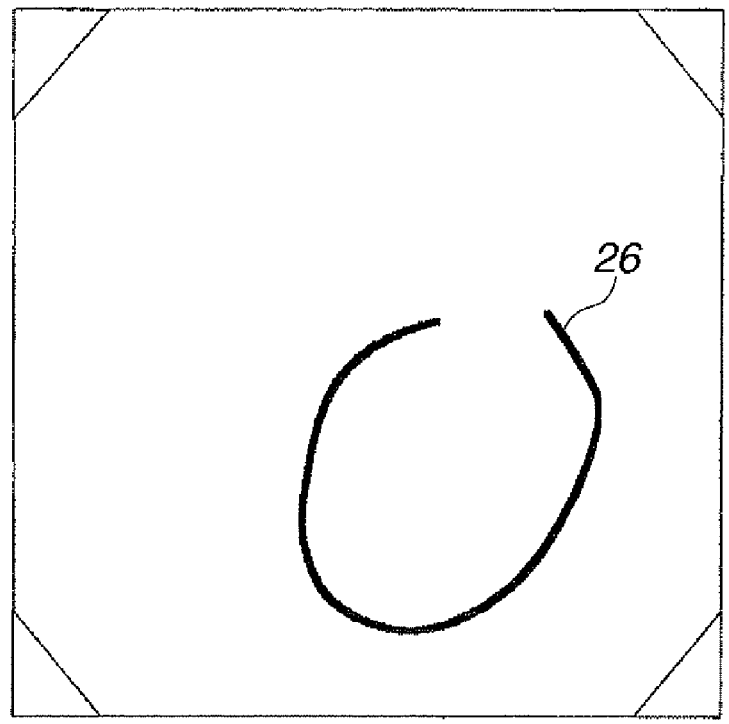
FIG. 7 is a diagram showing a possible polyp image stored in the memory of FIG. 1.
Figure 8:
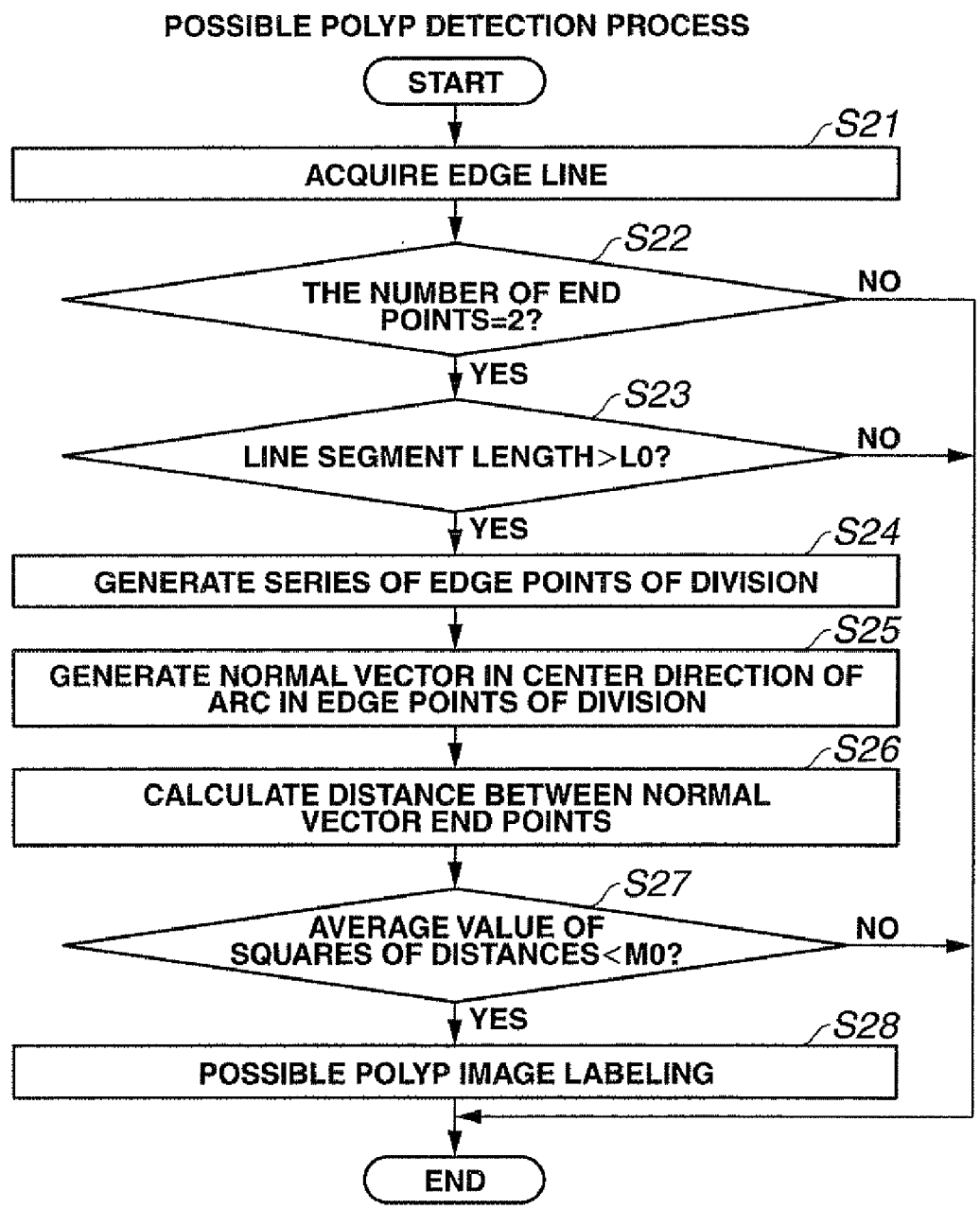
FIG. 8 is a flow chart showing a flow of a possible polyp detection process of FIG. 4.
Figure 9:
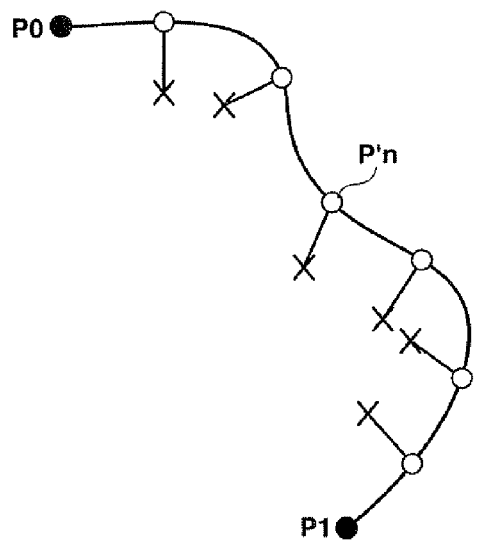
FIG. 9 is a first diagram for describing the process of FIG. 8.
Figure 10:
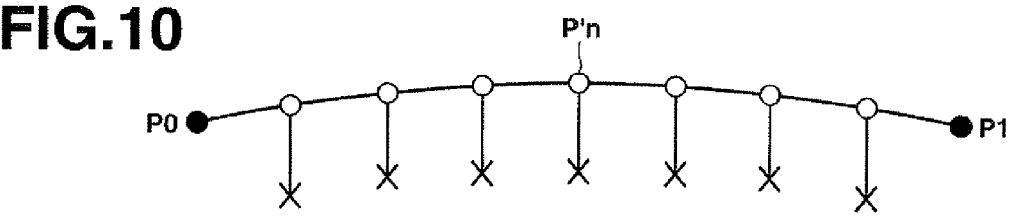
FIG. 10 is a second diagram for describing the process of FIG. 8.
Figure 11:
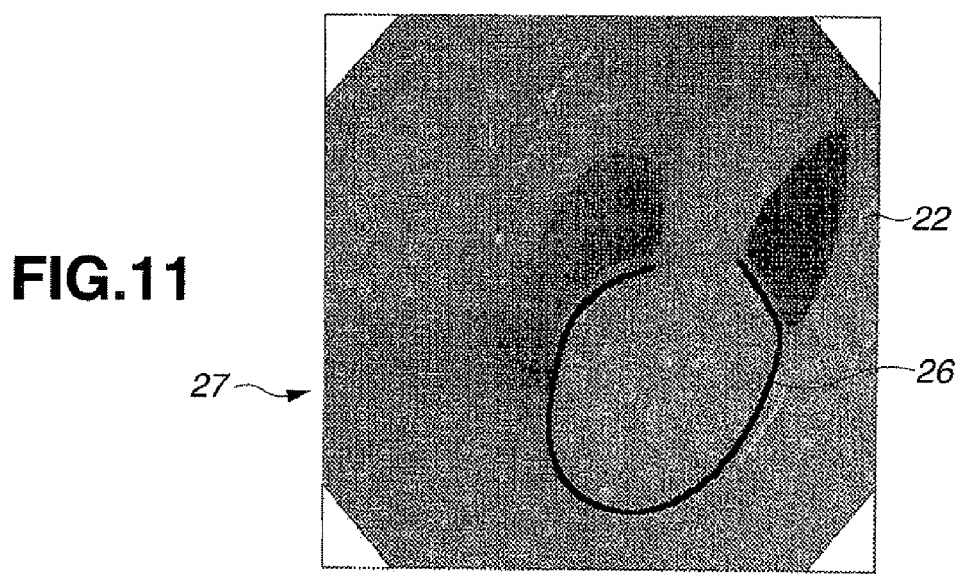
FIG. 11 is a diagram showing a possible polyp labeling image in which the possible polyp image displayed on a display device in the process of FIG. 3 is superimposed on the original image.

FIGS. 1 to 11 are related to a first embodiment of the present invention. FIG. 1 is a configuration diagram showing a configuration of an endoscopic image analysis device. FIG. 2 is a diagram showing information stored in a memory of FIG. 1. FIG. 3 is a flow chart showing a flow of a process of an image analysis program executed by a CPU of FIG. 1. FIG. 4 is a flow chart showing a flow of the image analysis process of FIG. 3. FIG. 5 is a diagram showing an original image stored in the memory of FIG. 1. FIG. 6 is a diagram showing a thinned image stored in the memory of FIG. 1. FIG. 7 is a diagram showing a possible polyp image stored in the memory of FIG. 1. FIG. 8 is a flow chart showing a flow of a possible polyp detection process of FIG. 4. FIG. 9 is a first diagram for describing the process of FIG. 8. FIG. 10 is a second diagram for describing the process of FIG. 8. FIG. 11 is a diagram showing a possible polyp labeling image in which the possible polyp image displayed on a display device in the process of FIG. 3 is superimposed on the original image.

(Configuration)

As shown in FIG. 1, an endoscopic image analysis device 1 of the present embodiment comprises an endoscopic observation device 2 that picks up an image inside a living body and that outputs an analog image signal, an endoscopic filing device 3 that generates image data from the analog image signal outputted by the endoscopic observation device 2 and that stores the generated image data, and an image processing device 4 that executes an image analysis process.

The image processing device 4 comprises: an information processing device 5 that executes information processing; an operation device 6 including a keyboard, a mouse, and the like; a storage device 7 including a hard disk and the like; and a display device 8 including display section such as a CRT, a liquid crystal display, a plasma display, or the like.

The endoscopic filing device 3 and the information processing device 5 are connected to, for example, a LAN 9 with TCP/IP as the protocol, and are capable of mutual communication.

A general personal computer is used as the information processing device 5, the computer acquiring the image data stored in the endoscope filing device 3 through the LAN 9, executing an image analysis process to the image data, and displaying an image analysis result on the display device 8.

Designating the image data to be processed, instructing acquisition of the designated image data, and instructing execution of the process are executed by an operation using the operation device 6.

In the information processing device 5, a CPU 10 as edge extraction processing section and possible intraluminal abnormal tissue detection processing section for executing the control and process, a memory 11 that stores processing program/data, an external storage I/F 12 that reads and writes information to and from the storage device 7, a network card 13 that communicates with an external device, an operation I/F 14 that executes input and output with the operation device 6, and a graphic board 15 that outputs a video signal on the display device 8 are connected to a bus 16 and communicate each other through the bus 16.

The network card 13 executes a data transmission and reception process with the endoscope filing device 3 connected to the LAN 9.

The operation I/F 14 receives an input signal inputted by the keyboard or the mouse of the operation device 6 and executes necessary data processing.

The storage device 7 is connected to the information processing device 5 and stores an image analysis program 20 for executing an image analysis process. The image analysis program 20 comprises a plurality of executable files, dynamic link library files, or configuration files.

The external storage I/F 12 reads out the image analysis program 20 stored in the storage device 7 and makes the memory 11 store the image analysis program 20.

As shown in FIG. 2, the memory 11 holds the image analysis program 20 and analysis data 21.

The image analysis program 20 stored in the memory 11 is a program with which the CPU 10 acquires endoscopic image data designated by the operation device 6 from the endoscope filing device 3, executes an image analysis process to the acquired image data, and executes a display process of an image analysis result to the display device 8.

The analysis data 21 stored in the memory 11 is data acquired and generated by the processes in the CPU 10. The stored analysis data 21 includes an original image 22 that is image data acquired from the endoscope filing device 3, a binarized image 23 that is generated by various processes described below, a labeling image 24, a thinned image 25, and a possible polyp image 26.

(Action)

A process of the image analysis program 20 executed by the CPU 10 will be described. In the process, the CPU 10 acquires image data designated by the operation of the operation device 6 from the endoscope filing device 3 and stores the image data in the memory 11 as the original image 22 in step S1 of an original image acquisition process as shown in FIG. 3.

In step S2 of an image analysis process, the CPU 10 processes the original image 22 acquired in the original image acquisition process step S1 to generate the binarized image 23, the labeling image 24, the thinned image 25, the possible polyp image 26, and an analysis process image not shown and store the processed images in the memory 11.

In step S3 of an analysis result display process, the CPU 10 executes a process of displaying the analysis process image on the display device 8.

The image analysis process of step S2 of FIG. 3 will be described using FIG. 4. As shown in FIG. 4, in a binarization process step of step S10, the CPU 10 operates the image analysis program 20 to execute an edge extraction process with a known Sobel filter to, for example, an R signal of the original image 22 as shown in FIG. 5. When a pixel value obtained as a processing result is equal to or greater than a predetermined threshold Rt, the CPU 10 generates the binarized image 23 in which the pixel is "1".

The edge extraction process is executed to, for example, the R signal of the original image 22. However, this arrangement is not restrictive, and the process may be executed to a G signal or a B signal of the original image 22.

In a labeling processing step of step S11, the CPU 10 generates the labeling image 24 in which a label is allocated to each of the connected components of the pixels whose pixel values of the binarized image are "1".

In a thinning processing step of step S12, the CPU 10 generates the thinned image 25 as shown in FIG. 6 in which each label value in the labeling image 24 is thinned by, for example, a known Hildich method. The thinned image 25 is an image in which an edge included in the original image 22 is extracted as an edge line formed of connected components of one pixel and a label is allocated to each connected component. Each edge includes a visible outline of an elevated possible lesion of large intestine and a visible outline of a structure other than the lesion.

The generation method of the labeling image 24 and the thinned image 25 is already known as disclosed in, for example, Japanese Patent Application Laid-Open Publication No. 2005-157902. Therefore, the description will be omitted.

With the possible polyp detection process step of step S13, the CPU 10 extracts only an edge line that is highly likely an elevated lesion from the edge lines of the thinned image 25 and generates the possible polyp image 26 as shown in FIG. 7.

The possible polyp detection process step of step S13 will be described next using the flow chart of FIG. 8. The possible polyp detection process is a process in which only an edge line that is highly likely an elevated lesion is extracted from the edge lines of the thinned image 25 to generate the possible polyp image 26.

As shown in FIG. 8, the CPU 10 acquires edge line information having a label value "1" in the labeling image 24 in step S21.

The CPU 10 calculates end points of the edge line in step S22. If the number of the end points is not "2", the edge line includes a branch/intersection or is a closed curve. Thus, the edge line is removed from the possible large intestine polyps in the present process.

In step S23, the CPU 10 calculates a line segment length of the edge line. The number of pixels is used in place of the line segment length in the present embodiment. If the line segment length is equal or less than a predetermined value L0, the edge line is regarded as noise and is removed from the possible large intestine polyps.

In step S24, the CPU 10 obtains points of division P'n that divide the edge line with Lc intervals. This method is realized by setting up an Lc-th pixel from an end point of the edge line as a point of division P'n. White circles in FIGS. 9 and 10 illustrate a distribution of the points of division P'n from an end point P0 to an end point P1.

In step S25, the CPU 10 obtains an interpolation curve that passes through the points of division P'n obtained in step S24. A curve equation with the interpolation curve as a parametric curve is delivered by determining four points (three points when interpolating between points including an end point) considered to exist on the curve and then applying the four points to a Catmull-Rom curve formula. Interpolation points on the interpolation curve can be easily obtained by setting a parameter t ($0 \leq t \leq 1$) of the parametric curve.

A normal vector of the edge line with the points of division P'n is then obtained. The tangent vector of the points of division P'n can be easily obtained by substituting t=0.0 or t=1.0 for a differential equation related to t in the parametric curve equation obtained with the above method. Therefore, a vector orthogonal to the tangent vector serves as the normal vector.

However, the normal vector includes two directions. Therefore, the direction closer to the midpoint between the point P0 and the point P1 is found for each point of division P'n, and the direction with larger number of directions is determined as the direction of the normal vector.

As a result, when the edge line is arc-shaped, the normal vector faces the center direction of the arc. The length of the normal vector is a predetermined length n0.

In step S26, the CPU 10 evaluates a degree of aggregation of the end point of the normal vector, the end point that is not a point of division (i.e., terminal point of the normal vector: marked x in FIGS. 9 and 10).

In the present embodiment, $$(x-\mu x)^2 + (y-\mu y)^2$$

is calculated which is a square of the distance from each normal vector end point, where average values of the x-coordinates and y-coordinates of the normal line vector end points are defined as μx and μy.

In step S27, the CPU 10 calculates an average value of the squares of the distances calculated in step S26. If the value is equal to or greater than a predetermined threshold M0, the CPU 10 removes the pertinent edge line from the possible large intestine polyps.

If the average value of the squares of the distances calculated in step S26 is less than the threshold M0, the CPU 10 generates the possible polyp image 26, in which the pixel of the edge line is "1", in step S28.

FIG. 9 illustrates an example of an edge line recognized as a possible polyp in the present embodiment, while FIG. 10 illustrates an example of an edge line not recognized as a possible polyp in the present embodiment.

(Advantage)

In the present embodiment, the CPU 10 executes the above processing steps for each label value of the thinned image 25 and superimposes the processing result on the possible polyp image 26, thereby generating a possible polyp labeling image 27 as shown in FIG. 11 on which the possible polyp edge is labeled. The possible polyp labeling image 27, in which the possible polyp image 26 is superimposed on the original image 22, is displayed on the display device 8 as shown in FIG. 11 so that the possible polyp location on the image can be easily checked.

(Second Embodiment)

Figure 12:
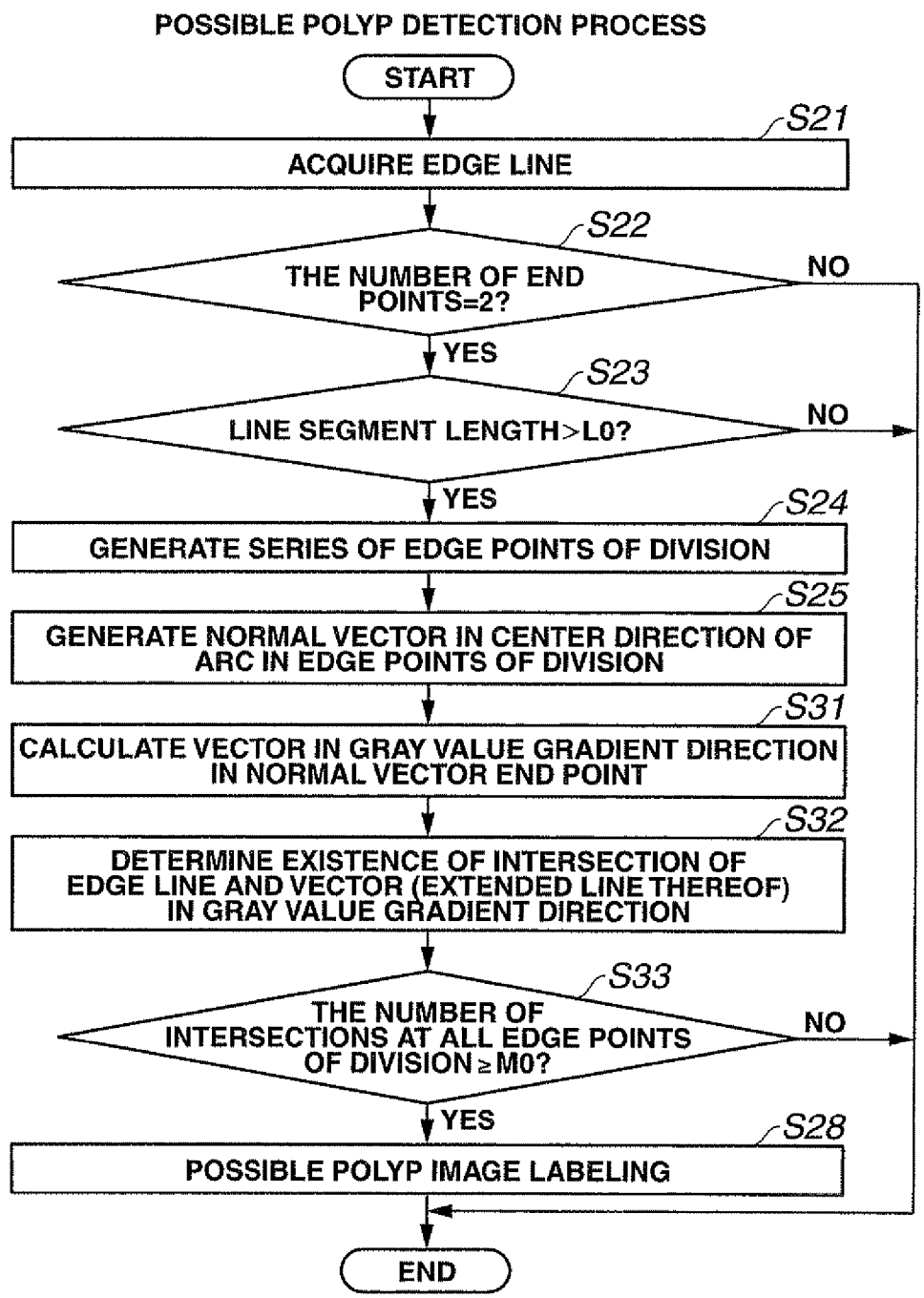
FIG. 12 is a flow chart showing a flow of a possible large intestine polyp detection process according to a second embodiment of the present invention.
Figure 13:
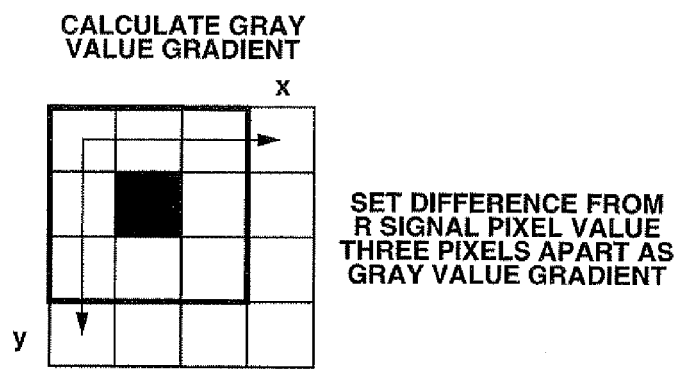
FIG. 13 is a first diagram for describing the process of FIG. 12.
Figure 14:
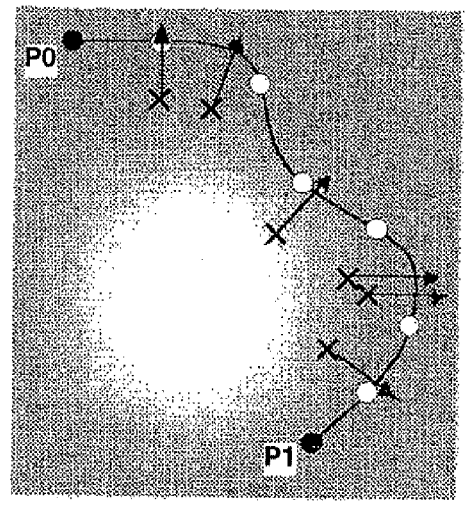
FIG. 14 is a second diagram for describing the process of FIG. 12.
Figure 15:
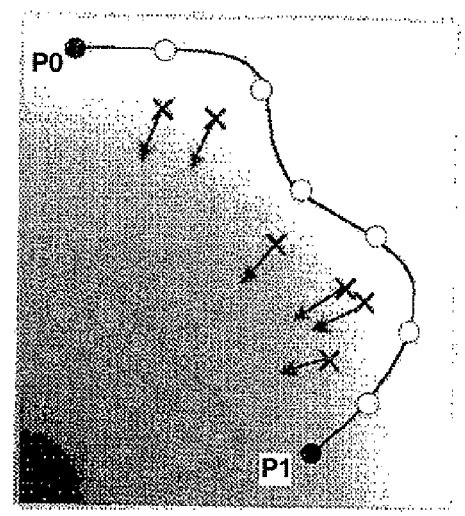
FIG. 15 is a third diagram for describing the process of FIG. 12.

FIGS. 12 to 15 are related to a second embodiment of the present embodiment. FIG. 12 is a flow chart showing a flow of a possible large intestine polyp detection process. FIG. 13 is a first diagram for describing the process of FIG. 12. FIG. 14 is a second diagram for describing the process of FIG. 12. FIG. 15 is a third diagram for describing the process of FIG. 12.

The second embodiment is almost the same as the first embodiment. Therefore, only different points will be described, and the same configurations are designated with the same reference numerals and the description will not be described.

In the present embodiment, part of the possible large intestine polyp detection process is different from the first embodiment. As shown in FIG. 12, in the present embodiment, the CPU 10 implements steps S21 to S25 and obtains the normal vector at the points of division P'n of the edge line in step S25 as in the first embodiment. The CPU 10 then obtains a gray value gradient of an R signal of the original image at the end point of the normal vector that is not a point of division (i.e., terminal point of the normal vector) in step S31.

As for the gray value gradient, differences of R pixel signals three pixels apart in the x and y directions are extracted with respect to 3 by 3 pixels around an end point of the normal vector as shown in FIG. 13. The average value of the difference values in the x and y directions is defined as an x-direction component and y-direction component of the gray value gradient.

The CPU 10 then checks the existence of an intersection between a straight line drawn in step S32 from the normal vector end point in the direction of the gray value gradient obtained in step S31 and the edge line. The method is performed by checking the straight line from the normal vector end point toward the gray value gradient direction to determine whether the straight line intersects with the edge line. For example, if the edge line is located so as to surround an area with a bright R-signal gray value as shown in FIG. 14, all normal vector end points intersect with the edge line. However, if the edge line is located so as to surround an area with a dark R-signal gray value as shown in FIG. 15, all normal vector end points do not intersect with the edge line. FIG. 14 illustrates an example in which the edges are extracted as a visible outline of polyp, while FIG. 15 illustrates an example in which folds in lumen are extracted when observing deep in the lumen.

Subsequently, the CPU 10 compares the number of generated intersections with the edge line and the predetermined threshold M0 in step S33. If the number of the intersections is equal to or greater than M0, the edge line is indicating a visible outline of polyp. Therefore, in step S28, the CPU 10 generates the possible polyp image 26 in which the pixel of the edge line is "1".

In the present embodiment, the CPU 10 obtains the gray value gradient from the differences from the pixel values three pixels apart. However, a configurable parameter variable N may be set up to obtain the differences N pixels apart, enabling to adjust the scale of the gray value gradient information.

In the present embodiment, the CPU 10 checks the gray value gradient near the edges to detect an edge line that does not have features of a polyp outline, and the possible lesion is presented by removing the edge line from the possible polyps, thereby supporting the lesion detection by the doctor.

(Third Embodiment)

Figure 16:
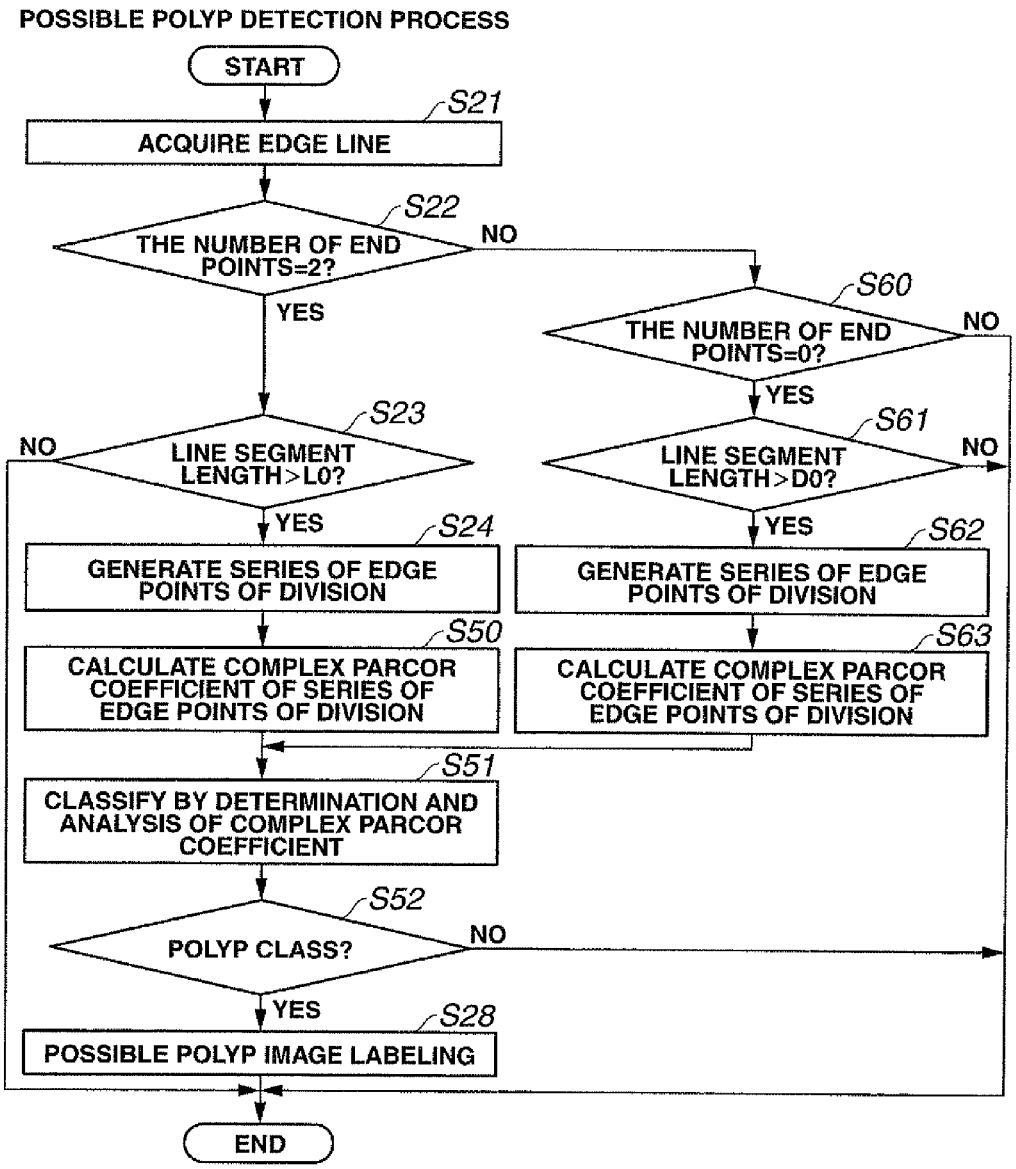
FIG. 16 is a flow chart showing a flow of a possible large intestine polyp detection process according to a third embodiment of the present invention.
Figure 17:
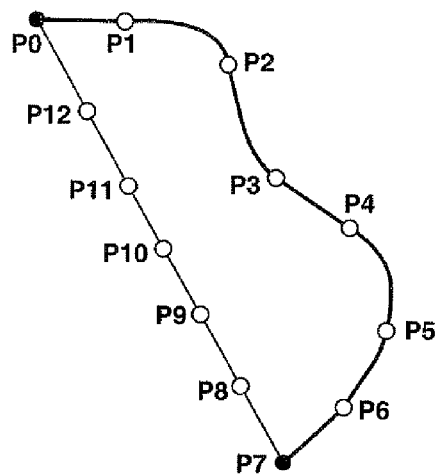
FIG. 17 is a first diagram for describing the process of FIG. 16.
Figure 18:
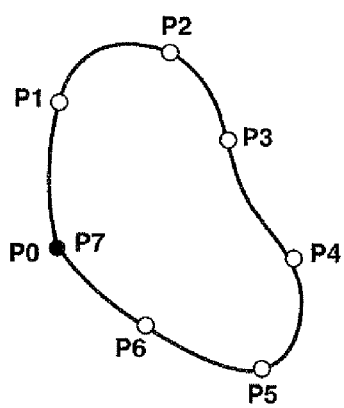
FIG. 18 is a second diagram for describing the process of FIG. 16.
Figure 19:
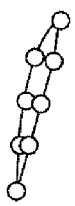
FIG. 19 is a third diagram for describing the process of FIG. 16.
Figure 20:
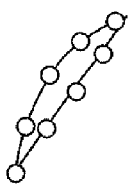
FIG. 20 is a fourth diagram for describing the process of FIG. 16.
Figure 21:
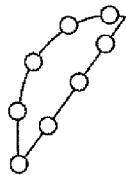
FIG. 21 is a fifth diagram for describing the process of FIG. 16.
Figure 22:
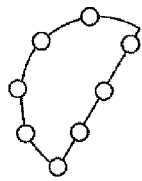
FIG. 22 is a sixth diagram for describing the process of FIG. 16.
Figure 23:
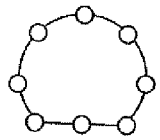
FIG. 23 is a seventh diagram for describing the process of FIG. 16.
Figure 24:
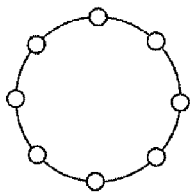
FIG. 24 is an eighth diagram for describing the process of FIG. 16.
Figure 25:
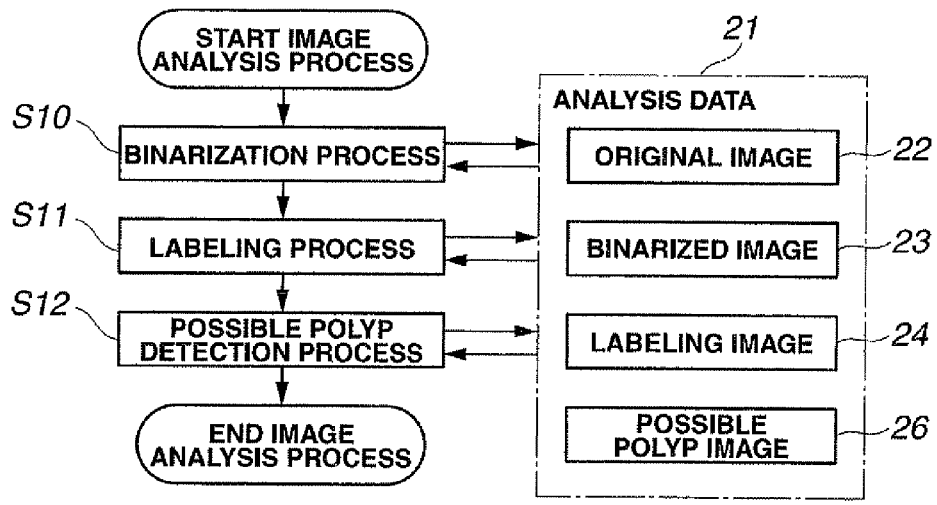
FIG. 25 is a diagram showing a process of an image analysis program for implementing a modified example of the possible large intestine polyp detection process of FIG. 16.
Figure 26:
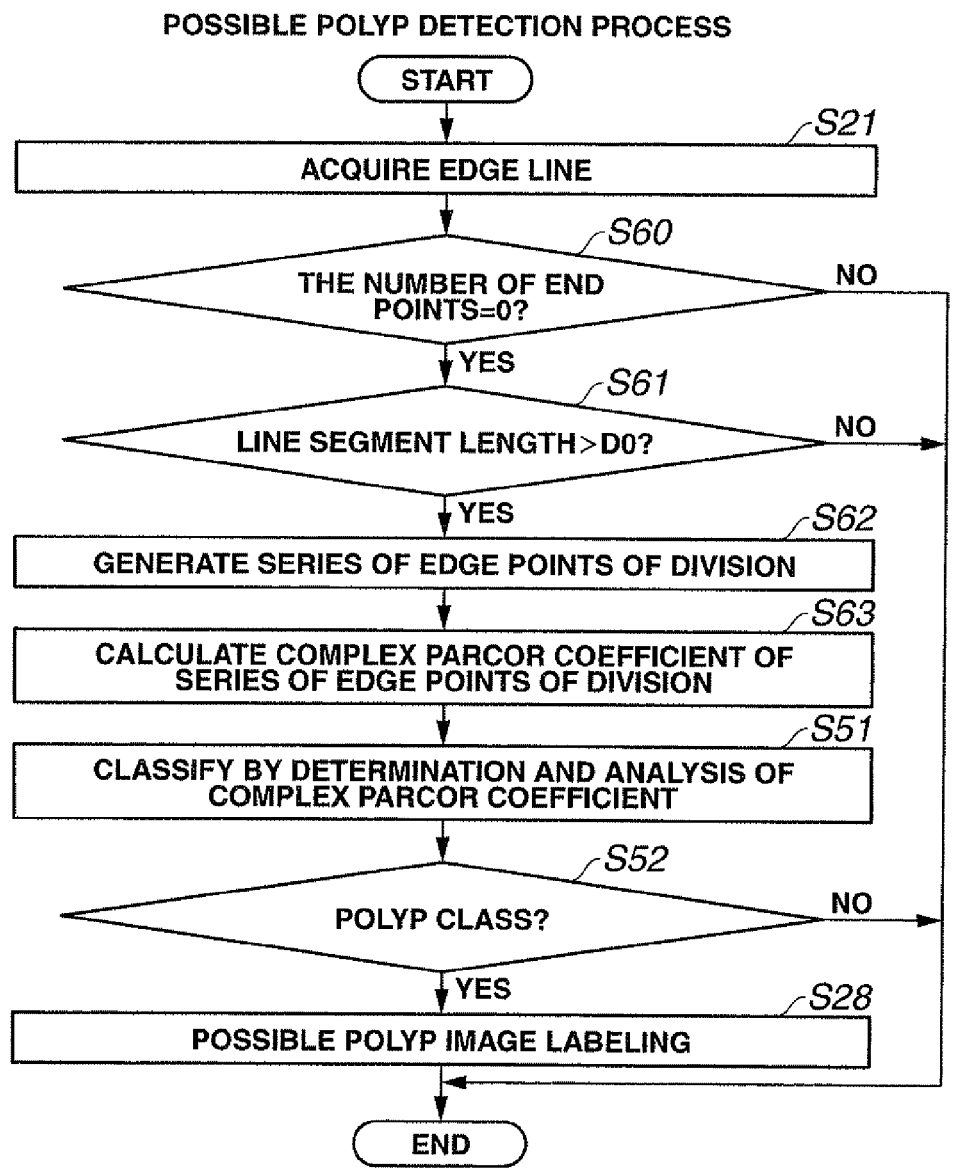
FIG. 26 is a flow chart showing a flow of the possible large intestine polyp detection process of FIG. 25.
Figure 27:
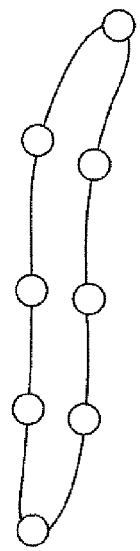
FIG. 27 is a first diagram for describing the process of FIG. 26.
Figure 28:
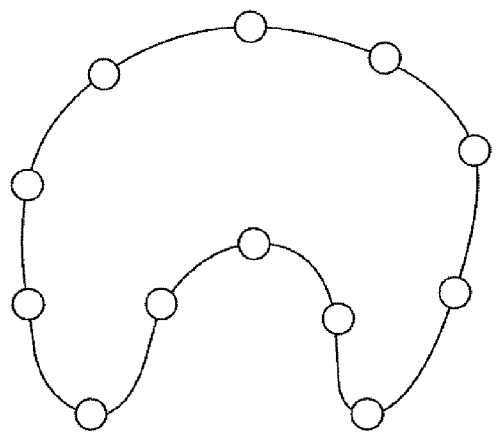
FIG. 28 is a second diagram for describing the process of FIG. 26.
Figure 29:
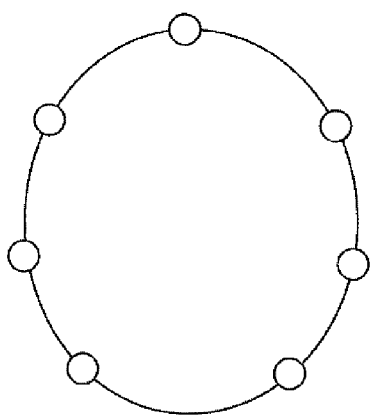
FIG. 29 is a third diagram for describing the process of FIG. 26.

FIGS. 16 to 29 are related to a third embodiment of the present invention. FIG. 16 is a flow chart showing a flow of a possible large intestine polyp detection process. FIG. 17 is a first diagram for describing the process of FIG. 16. FIG. 18 is a second diagram for describing the process of FIG. 16. FIG. 19 is a third diagram for describing the process of FIG. 16. FIG. 20 is a fourth diagram for describing the process of FIG. 16. FIG. 21 is a fifth diagram for describing the process of FIG. 16. FIG. 22 is a sixth diagram for describing the process of FIG. 16. FIG. 23 is a seventh diagram for describing the process of FIG. 16. FIG. 24 is an eighth diagram for describing the process of FIG. 16. FIG. 25 is a diagram showing an image analysis program for implementing a modified example of the possible large intestine polyp detection process of FIG. 16. FIG. 26 is a flow chart showing a flow of the possible large intestine polyp detection process of FIG. 25. FIG. 27 is a first diagram for describing the process of FIG. 26. FIG. 28 is a second diagram for describing the process of FIG. 26. FIG. 29 is a third diagram for describing the process of FIG. 26.

The third embodiment is almost the same as the first embodiment. Therefore, only different points will be described, and the same configurations are designated with the same reference numerals and the description will not be described.

In the present embodiment, the possible large intestine polyp detection process is different from that in the first embodiment. As shown in FIG. 16, the CPU 10 acquires edge line information having a label value "1" in the labeling image 24 in step S21.

The CPU 10 calculates end points of the edge line in step S22. If the number of end points is 2, the edge line is regarded as an open curve without a branch/intersection. An open curve connecting the end points is formed, and the process proceeds to step S23. If the number of end points is not 2, the process proceeds to step S60. If the number of end points is 0, the edge line is regarded as a closed curve without a branch, and the process proceeds to step S61. If the number of end points is two or more, all of the following processes are skipped in the present process to remove the edge line from the possible large intestine polyp.

Even if the number of end points is 2, the closed curve may include a branch/intersection. Therefore, the detection accuracy of the present embodiment can be improved by checking and determining the number of branch points and the number of intersections.

In step S23, the CPU 10 calculates a circumference of the edge line. In the present embodiment, the number of pixels is used in place of the circumference. If the circumference is equal or less than the predetermined value L0, the edge line is regarded as noise and is removed from the possible large intestine polyps.

In step S24, the CPU 10 obtains points of division P'n that divide the edge line into n. Generation of the points of division is realized by finding a distance Lc between the points of division with Lc=(line segment length)/n, setting an arbitrary point on the edge (end point P0 of the edge line calculated in step S22 in the present embodiment) as a starting point and setting Lc-th pixels as the points of division in sequence clockwise. FIG. 17 illustrates an example of the result, in which a series of points of division is generated clockwise from the end point P0.

The CPU 10 calculates a complex PARCOR coefficient of the series of edge points of division in step S50 and proceeds to step S51. The scale of the coordinate values of the series of points is converted such that the circumference becomes 1.

The complex PARCOR coefficient is a feature value related to the shape formed by the series of points, and an example of reference document includes "The Institute of Electronics, Information and Communication Engineers Transactions D-II Vol. J73-D-II No. 6 pp 804-811, June 1990".

A process flow when the number of end points is 0 will be described next.

In step S61, the CPU 10 obtains the circumference of the edge line. In the present embodiment, the number of pixels is used in place of the line segment length as in step S23. If the circumference is equal or less than a predetermined value D0, the edge line is regarded as noise and is removed from the possible large intestine polyps.

In step S62, the CPU 10 obtains the points of division P's that divide the edge line into n. The method is similar to that in step S24. Generation of the points of division is realized by finding a distance Dc between the points of division with Dc=(edge circumference)/n, setting an arbitrary point on the edge line (point with the minimum y-coordinate among the points on the edge line with the minimum x-coordinate in the present embodiment) as a starting point P0, and setting Dc-th pixels as the points of division in sequence clockwise. FIG. 18 illustrates an example of the result of the generation of a series of points of division, in which end points P0 to P6 are set up and P7 overlaps P0.

The CPU 10 calculates the complex PARCOR coefficient of the series of edge points of division in step S63 and proceeds to step S51. The scale of the coordinate values of the series of points is converted such that a length of a side of the smallest square surrounding the targeted closed curve is 1.

In step S51, the CPU 10 determines and analyzes the complex PARCOR coefficients obtained in steps S50 and S63. Teacher data examples of the determination and analysis are illustrated in FIGS. 19 to 24. Among these, the teacher data examples determined to be in a polyp class as correct examples indicative of large intestine polyp are, for example, FIGS. 23 and 24.

If the result is identified as a polyp class in step S51, the CPU 10 determines that the edge shape indicates large intestine polyp in step S52 and generates the possible polyp image 26, in which pixels of the pertinent edge line is 1, in step S28.

As described, in the present embodiment too, the possible polyp location on the image can be easily checked by superimposing the possible polyp image 26 on the original image 22 and displaying on the display device 8.

In the present embodiment, as in the first embodiment, the CPU 10 obtains the edge line in the thinned image 25 to implement the possible large intestine polyp detection process of FIG. 16. However, this arrangement is not restrictive. As shown in FIG. 25, the edge line in the labeling image 24, in which a label is allocated to each connected component of pixels having pixel value 1 in the binarized image, may be obtained, without generating the thinned image 25, to thereby implement the possible large intestine polyp detection process as shown in FIG. 26.

More specifically, the labeling image 24 that is not thinned exhibits a closed curve image as shown for example in FIGS. 27 to 29. With the edge line serving as the labeling image 24, the points of division P'n that divide the edge line into n may be obtained to calculate the complex PARCOR coefficient of the series of edge points of division. The complex PARCOR coefficient may be determined and analyzed to generate the possible polyp image 26 (in the examples of FIGS. 27 to 29, FIGS. 28 and 29 are the possible polyp images 26).

(Fourth Embodiment)

Figure 30:
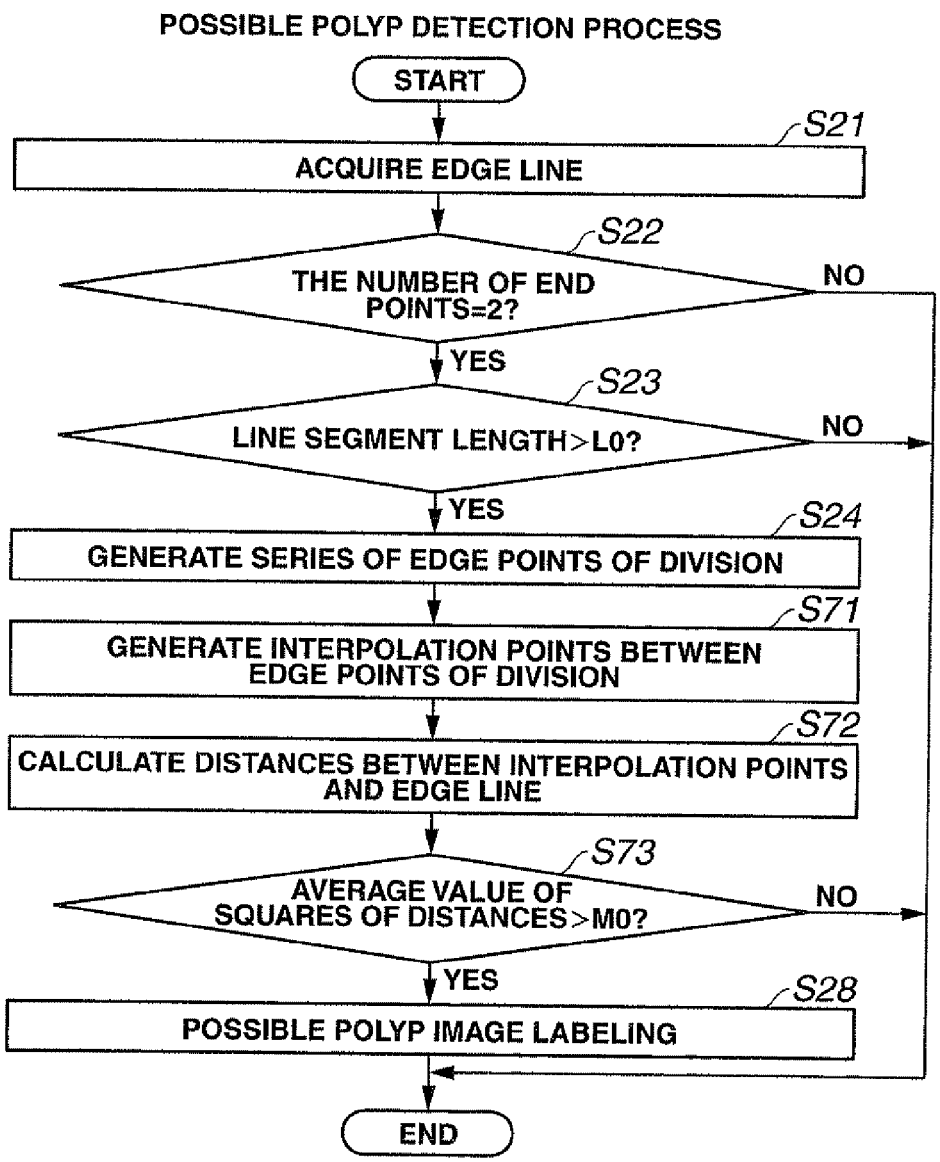
FIG. 30 is a flow chart showing a flow of a possible large intestine polyp detection process according to a fourth embodiment of the present invention.
Figure 31:
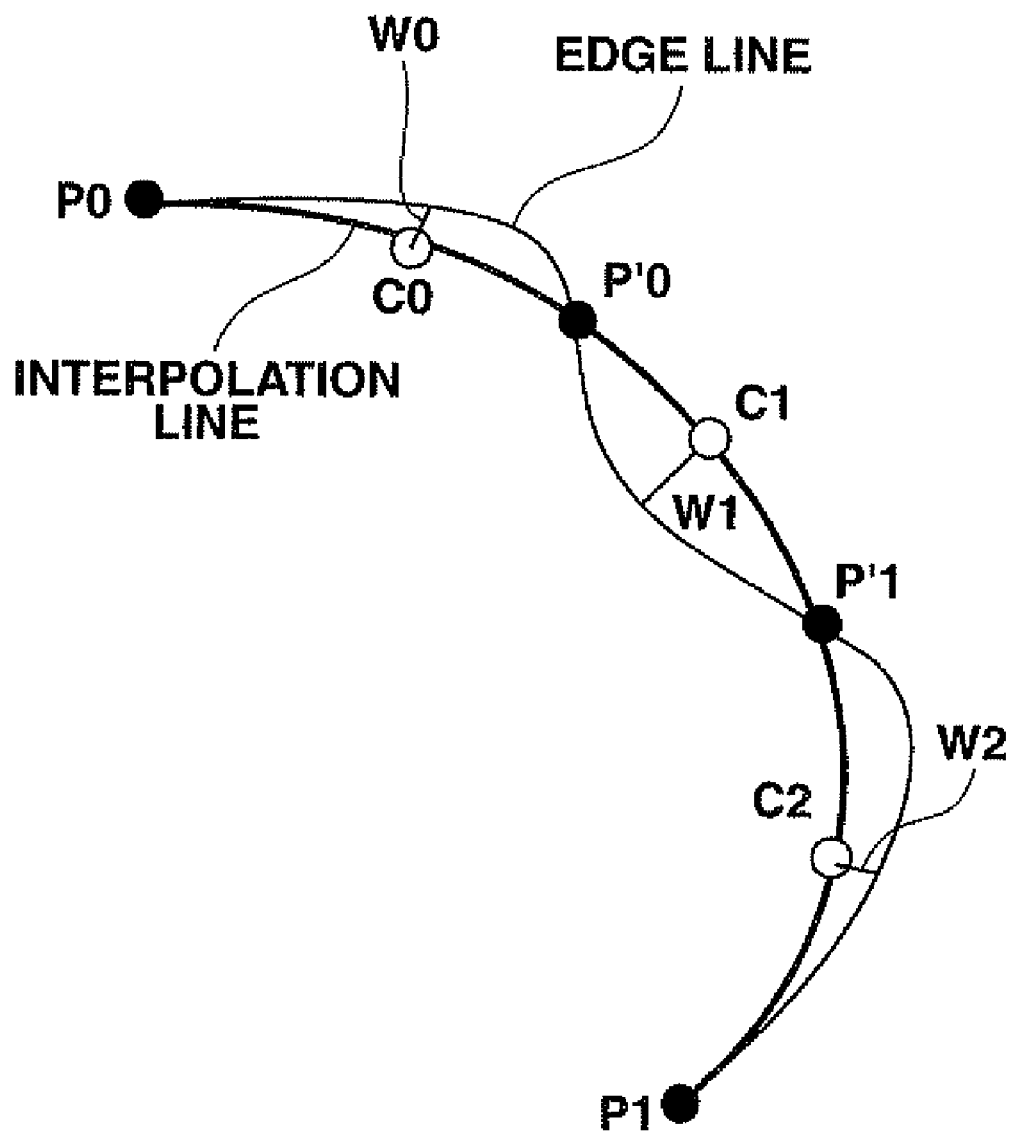
FIG. 31 is a diagram for describing the process of FIG. 30.

FIGS. 30 and 31 are related to a fourth embodiment of the present invention. FIG. 30 is a flow chart showing a flow of a possible large intestine polyp detection process. FIG. 31 is a diagram for describing the process of FIG. 30.

The fourth embodiment is almost the same as the first embodiment. Therefore, only different points will be described, and the same configurations are designated with the same reference numerals and the description will not be described.

In the present embodiment, part of the possible large intestine polyp detection process is different from the first embodiment. As shown in FIG. 30, the CPU 10 implements steps S21 to S24 in the present embodiment and obtains the points of division P'n that divide the edge line into n in step S24 as in the first embodiment.

FIG. 31 illustrates an example of the result of the generation of two points of division P'0 and P'1 from the end point P0 to the end point P1.

In step S71, the CPU 10 obtains interpolation points on an interpolation curve that passes through the end points P0, P1, and the points of division P'n. The interpolation points on the interpolation curve are easily obtained by setting up a parameter t ($0 \leq t \leq 1$) of the parametric curve. In the present embodiment, the interpolation points C0, C1, and C2 are set up respectively as midpoints from P0 to P'0, P'0 to P'1, and P'1 to P1, and t=0.50 is substituted for each curve equation to thereby obtain the interpolation points.

In step S72, the CPU 10 obtains a straight line equation that intersects with an interpolation curve, which passes through the interpolation points, in the normal line direction. A tangent vector of the curve in the interpolation points is easily obtained by substituting the value t, which has been substituted for generating the interpolation points, for a differential related to t of the parametric curve equation in step S71. Therefore, a direction vector that is orthogonal to the direction vector exhibits a slope of the straight line equation. The straight line indicative of the obtained straight line equation is then traced from the interpolation point Cn as a starting point, and a distance Wn from a point intersecting with the edge line and Cn as the starting point is obtained.

In step S73, the CPU 10 obtains an average value of the squares of the distances Wn in the interpolation points Cn obtained in step S72. If the average value is equal to or greater than the predetermined value M0, the shape of the edge is determined to be irregular, and the possible polyp image 26 is generated, in which the pixels of the pertinent edge line is 1.

In the present embodiment too, the possible polyp location on the image can be easily checked by superimposing the possible polyp image 26 on the original image 22 and displaying on the display device 8.

In the above embodiments, endoscopic image data in a large intestine has been used as an example of the image data, and a large intestine polyp has been described as an example of the intraluminal abnormal tissue. However, this arrangement is not restrictive, and other intraluminal image data can also be applied to detect other intraluminal abnormal tissues.

The present invention is not limited to the embodiments described above. Various changes and modifications can be made without departing from the scope of the present invention.

What is claimed is:

1. An image analysis device, comprising:
   an edge extraction processing section for executing an edge extraction process that extracts an edge of an intraluminal image; and
   a possible intraluminal abnormal tissue detection processing section for determining whether the edge is an edge of an intraluminal abnormal tissue based on edge line data and/or edge periphery pixel data of each edge extracted by the edge extraction section;
   wherein the possible intraluminal abnormal tissue detection processing section determines whether the edge is an edge of the intraluminal abnormal tissue based on an intersection determination of a direction vector of a pixel value gradient of the edge periphery and the edge line.

2. An image analysis device, comprising:
   an edge extraction processing section for executing an edge extraction process that extracts an edge of an intraluminal image; and
   a possible intraluminal abnormal tissue detection processing section for determining whether the edge is an edge of an intraluminal abnormal tissue based on edge line data and/or edge periphery pixel data of each edge extracted by the edge extraction section;
   wherein the possible intraluminal abnormal tissue detection processing section determines whether the edge is an edge of the intraluminal abnormal tissue based on a complex PARCOR coefficient of the edge.

3. An image analysis device, comprising:
an edge extraction processing section for executing an edge extraction process that extracts an edge of an intraluminal image; and
a possible intraluminal abnormal tissue detection processing section for determining whether the edge is an edge of an intraluminal abnormal tissue based on edge line data and/or edge periphery pixel data of each edge extracted by the edge extraction section;
wherein the possible intraluminal abnormal tissue detection processing section determines whether the edge is an edge of the intraluminal abnormal tissue based on a complexity of a curve formed by the edge.

4. The image analysis device according to claim 1, wherein the intraluminal abnormal tissue is a large intestine polyp.

5. The image analysis device according to claim 2, wherein the intraluminal abnormal tissue is a large intestine polyp.

6. The image analysis device according to claim 3, wherein the intraluminal abnormal tissue is a large intestine polyp.

* * * * *